United States Patent [19]
Yoshida et al.

[11] Patent Number: 5,560,318
[45] Date of Patent: Oct. 1, 1996

[54] METHOD OF RAISING SEA-WATER FISH, DISPLAY TANK FOR SEA-WATER FISH AND TANK SYSTEM FOR RAISING SEA-WATER FISH

[75] Inventors: Norihiro Yoshida; Tatsuo Hikosaka, both of Aichi-ken, Japan

[73] Assignee: ODI Co., Ltd., Japan

[21] Appl. No.: 363,913

[22] Filed: Dec. 27, 1994

[30] Foreign Application Priority Data

Dec. 28, 1993 [JP] Japan .................... 5-352943

[51] Int. Cl.⁶ ............................................. A01K 63/04
[52] U.S. Cl. ........................ 119/248; 119/260; 119/227
[58] Field of Search ............................... 119/226, 227, 119/259, 260, 261, 262, 248; 210/617, 293, 416.2

[56] References Cited

U.S. PATENT DOCUMENTS

| | | | |
|---|---|---|---|
| 2,889,275 | 6/1959 | Moore | 210/617 |
| 4,684,462 | 8/1987 | Augustyniak | 119/260 |
| 4,752,388 | 6/1988 | Ng | 119/261 |
| 4,817,561 | 4/1989 | Byrne et al. | 119/260 |
| 4,861,465 | 8/1989 | Augustyniak | 119/227 |

FOREIGN PATENT DOCUMENTS

| | | |
|---|---|---|
| 0383713A1 | 8/1990 | European Pat. Off. . |
| 63-151323 | 3/1989 | Japan . |
| 1071428 | 3/1989 | Japan . |
| 2262423A | 6/1993 | United Kingdom . |
| 87/01010 | 2/1987 | WIPO . |

*Primary Examiner*—Robert P. Swiatek
*Assistant Examiner*—Elizabeth Shaw
*Attorney, Agent, or Firm*—Finnegan, Henderson, Farabow, Garrett & Dunner, L.L.P.

[57] ABSTRACT

A method of raising sea-water fish is performed by raising the sea-water fish in water in a display tank which includes a device for circulating the water in the tank, a filtering material supporting plate having a sand-like filtering material containing calcium therein. In this case, the grain size of the sand-like filtering material is set between 2.5–3.5 mm. Coral sand is preferably used as the sand-like material, since it promotes the propagation of aerobic bacteria and converts ammonia and nitric acid to harmless materials and the above grain size exhibits better effect. This method can be performed by a display tank system including a tank for storing the water therein, a bottom filtering sections including the coral sand, an external filtering system disposed outside the tank, a feed-out tube for feeding the water in the tank to the external filtering system, and a mechanism for circulating the water which has been filtered by the bottom filtering section through the feed-out tube and the external filtering system into the tank again. The feed-out tube can be provided with a bypass mechanism for feeding the water in the tank to the external filtering system directly without passing the bottom filtering section.

12 Claims, 9 Drawing Sheets

METHOD OF RAISING SEA-WATER FISH, DISPLAY TANK FOR SEA-WATER FISH AND TANK SYSTEM FOR RAISING SEA-WATER FISH

BACKGROUND OF THE INVENTION

1. Field of the Invention

This invention relates to a method of raising sea-water fish, a display tank for sea-water fish and tank system for raising sea-water fish.

2. Description of the Prior Art

As personal interests have diversified in recent years, there are many homes which false pet animals indoors.

However, even within the range of personal interests, because animals are raised, some problems have arisen. For example, a certain amount of space is required for raising animals and noise caused by such animals may disturb other people in the neighborhood.

In view of this background, the number of homes in which display fish, such as tropical fish for example, are raised has been increasing recently, since they can be raised and appreciated in a limited space even in the home.

Display fish are highly valued as pets since they do not need a large space to be raised, produce no bad smells and make no noise.

For this reason, there are many homes in which display fish are raised. In this regard, most of such homes raise fresh-water fish. However, very few of such homes raise sea-water fish for display purposes.

In reality, sea-water fish are very colorful and very active due to their quick movements, and therefore it can be said that for display purposes they are even more suitable than fresh-water fish. However, raising sea-water fish for display purpose has not been popular so far.

This is because sea-water fish must be raised in an environment consisting of water which contains salt, and this can lead to a reduction in the amount of oxygen dissolved therein. As a result, bacteria which dislike oxygen are more likely to propagate.

When bacteria which dislike oxygen, namely anaerobic bacteria, are growing, the waste products etc. are inevitably converted into sulfides which are very toxic.

As a result, there arises problems in raising sea-water fish for display purposes. Namely, it becomes difficult to maintain a proper environment for raising sea-water fish.

In other words, in order to keep sea-water fish over a prolonged period of time, it is necessary to provide an environment in which the fish themselves can thrive easily. In this case, it can be said that an environment in which they can thrive easily is, in practice, an environment from which harmful or lethal agents or factors have been removed or eliminated as much as possible.

Factors which are lethal to sea-water fish can be listed as follows:

1. Abnormal specific gravity (salt concentration) (Outside the range 1.016–1.024)
2. Abnormal water temperature
   (a) Outside the range 20°–30° C.
   (b) Sudden changes in water temperature
3. Abnormal pH (Outside the range 7.5–8.2)
4. Insufficient food
5. Excessive numbers of fish
   (a) A number of fish exceeding the limit for the number which can be tolerated in the tank.
   (b) Fish of a size exceeding the limit for the volume of fish which can be tolerated in the tank.
6. Deterioration of water quality
   (a) The admixture of impurities.
   (b) Ammonia formation.
   (c) Nitric acid formation.
   (d) The formation of poisonous gases by anaerobic bacteria.
7. Oxygen deficiency
8. Trouble between fish (preying on each other, disputes, cannibalism etc.)
9. The outbreak of disease (Cryptocaryon irritans)
   (a) White spot disease
   (b) Lymphocystis
   (c) Trichodina
   (d) Finrot
   (e) Pop-eye
   (f) Oodinium
   (g) Nutritional disease (Desease for refusing foof)
   (h) Parasites
   (i) Diseases of the internal organs Here, in the causes of death mentioned above, some 90–95% of deaths are due to (b) ammonia formation, (c) nitric acid formation, and (d) the formation of poisonous gases by anaerobic bacteria, which are classified under 6 deterioration of water quality, and (a) white spot disease, which is classified under 9 the outbreak of disease.

The above causes (b), (c) and (d) of 6 can be overcome by improving the filtration system and using aerobic bacteria, and the cause (a) of 9 can be overcome satisfactorily by improving the filtration system in the same way, or by treatment with drugs as an alternative method.

Hence, most of the causes of death can be eliminated by improving the filtration system.

That is to say, in order to prevent the ammonia formation of (b) and the nitric acid formation of (c) of 6, an environment in which aerobic bacteria can grow must be established, since aerobic bacteria can convert these materials to harmless materials.

Furthermore, in order to prevent the formation of poisonous gases by anaerobic bacteria of (d), it is necessary to establish an environment such that aerobic bacteria which like oxygen can grow, since anaerobic bacteria dislike oxygen.

Moreover, the white spot disease (a) of 9 is caused by a unicellular ciliate parasite, and this disease tends to propagate explosively on the sea bottom. Therefore, in order to avoid this, it is important to establish an environment in which the flow of water is circulated from the top to the bottom and filtered such that no unicellular ciliates are introduced into the region in which the fish are living.

Thus, in conclusion, in order to establish an environment which is suitable for the keeping of sea-water fish, it is necessary not only to use a tank equipped with an excellent filtering apparatus, but also to use a filtering material which facilitates the propagation of aerobic bacteria. For this reason, development of these filtering materials is very important.

In view of this, sand, active carbon, zeolites and ceramics and the like which are materials in which the growth of aerobic bacteria is facilitated, have been developed and used as filtering materials.

Among these materials, sand is mainly used as the filtering material in many cases, since it is cheap in terms of price (for example, see Japanese Laid-open Patent No. 63-151323).

However, when sand is used, the ammonia and nitric acid in the water are not assimilated satisfactorily. This is considered to result from the fact that the growth of aerobic bacteria is insufficient when sand is used.

SUMMARY OF THE INVENTION

This invention has been made based upon an understanding of the situation as described above, and therefore it is an object of the present invention to provide a method of raising sea-water fish using a cheap filtering material in which the growth of aerobic bacterial is facilitated. It is a further object of the present invention to provide equipment including a tank and a raising system for carrying out this method.

In view of this, the inventors of the present invention have conducted research for achieving the above-stated object by using a tank having a filter provided on the bottom thereof and a cheap sand-like material such as large beach sand, coral sand, silica sand, river sand, sea-sand and the like. As a result, the inventors have found that a sand-like material which contains a lot of calcium, such as coral sand for example is a preferred material for growing aerobic bacteria.

Further, the present inventors also discovered that if the sand-like material which contains a lot of calcium was of a certain size, then aerobic bacteria were propagated reliably and the circulation of water in a fish-raising tank was satisfactorily maintained. Consequently, the present invention has been made based upon these findings.

Accordingly, the present invention is directed to a method of raising sea-water fish which is performed by raising the sea-water fish in water in a display tank which includes means for circulating the water in the tank, a filtering material supporting plate having a plurality of fine holes and a sand-like filtering material containing calcium therein, in which the grain size of the sand-like filtering material is set at a value between 2.5–3.5 mm.

In this case, it is preferred that coral sand is used as the sand-like material.

Further, the present invention is also directed to a sea-water fish display tank which comprises: means for circulating water therein; a filtering material supporting plate having a plurality of fine holes; and a filter placed on the false bottom, the filler being formed from a sand-like material containing calcium therein, wherein the grain size of the sand-like material is set at 2.5 mm–3.5 mm.

In this case, it is preferred that the calcium-containing sand-like material consist essentially of coral sand.

Furthermore, the present invention is also directed to a sea-water fish raising system which comprises: a tank having a bottom for storing water for raising sea-water fish therein; a bottom filtering means including a filtering material supporting plate which is formed with a plurality of fine holes and arranged so as to define a space thereunder and a filtering material placed on the supporting plate; and an external filtering means which is disposed outside the tank; a feed-out tube for communicating the space of the bottom filtering means to the external filtering means; and means for circulating the water which has been filtered by the bottom filtering means through the feed-out tube and the external filtering device into the tank again.

Moreover, the present invention is also directed to a sea-water fish raising system which comprises: a tank having a bottom for storing water for raising sea-water fish therein; a bottom filtering means including a filtering material supporting plate which is formed with a plurality of fine holes and arranged so as to define a space thereunder, and a filtering material placed on the supporting plate; and an external filtering means which is disposed outside the tank; a feed-out tube for communicating the space of the bottom filtering means to the external filtering means; means for circulating the water which has been filtered by the bottom filtering means through the feed-out tube and the external filtering means into the tank again; and bypass means provided in the feed-out tube for feeding the water in the tank into the external filtering means directly without passing through the bottom filtering means as necessary.

In this invention, it is preferred that the bypass means include at least one opening formed in the water feeding tube, and an outer tube which also has at least one opening and is slidably fitted onto the feed-out tube for opening and closing the at least one opening of the feed-out tube.

Alternatively, it is also preferred that the bypass means include at least one opening formed in the water feeding tube, and an ouster tube which also has at least one opening and is rotatably fitted onto the feed-out tube for opening and closing the at least one opening of the feed-out tube.

Further, in the present invention, it is preferred that the external filtering means include a filtering material formed from a ceramic filtering material and a mat.

Furthermore, it is also preferred that the external filtering means is placed on a rack on which the tank is placed.

Moreover, it is also preferred that the filtering material of the bottom filtering means consist essentially of coral sand having a grain size of 2.5 to 3.5 mm.

The circulation of the water in the tank according to the present invention is described below.

When the pump is started, the water in the tank flows along the surface of the sand-like material which is placed on the filtering material supporting plate of the bottom filtering means so as to pass uniformly through the whole of the bottom of the tank, and then the water is passed through the holes in the mesh-like sheet and the fine holes in the punched sheet into the bottom space to flow into the space under the supporting plate.

Then, the water passes from here through the feed-out pipe and raised temporarily to the top of the tank and then descends and is fed to a sealed-type external filter.

In this external filter, the water is passed through a ceramic filter material and a mat material and subjected to biological filtration and physical filtration, and then it is passed through a supply tube by pump pressure and introduced to a sterilizing lamp unit.

Here, microorganisms are killed by the sterilizing effect of the light.

It is then passed through another feed tube and raised to the top of the tank, and discharged in the vicinity of the water surface in the tank.

BRIEF DESCRIPTION OF THE DRAWINGS

FIG. 5 (B) is a side view which illustrates diagrammatically the state of flow in the bottom part of Tank B;

FIG. 5 (C) is a side view which illustrates diagrammatically the state of flow in the bottom part of Tank C;

DETAILED DESCRIPTION OF THE PREFERRED EMBODIMENT

Hereinafter, a preferred embodiment of the present invention will be described with reference to the drawings.

Figure 1:
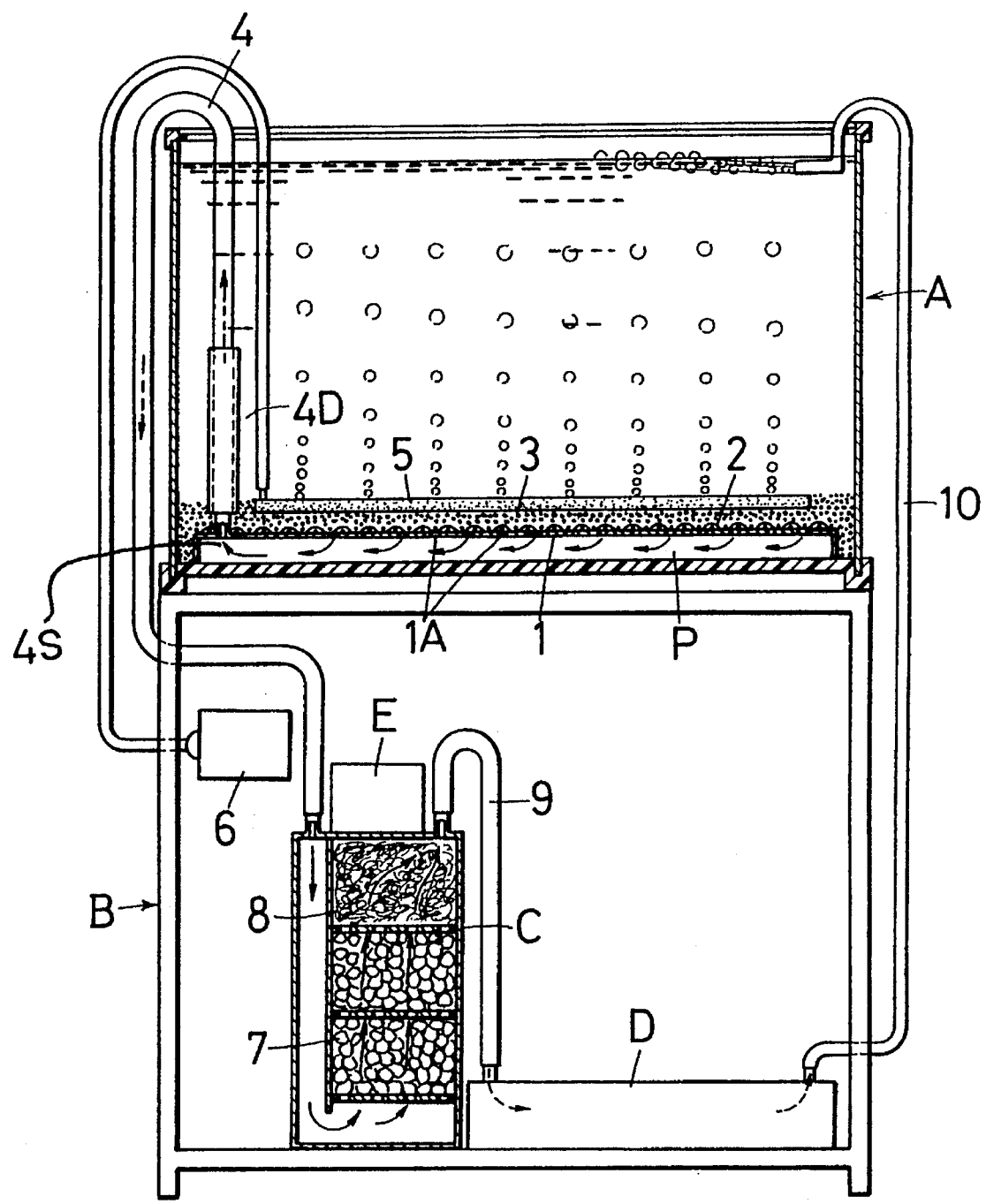
FIG. 1 is an overall view which shows an embodiment of a sea-water fish raising system according to the present invention.
Figure 2:
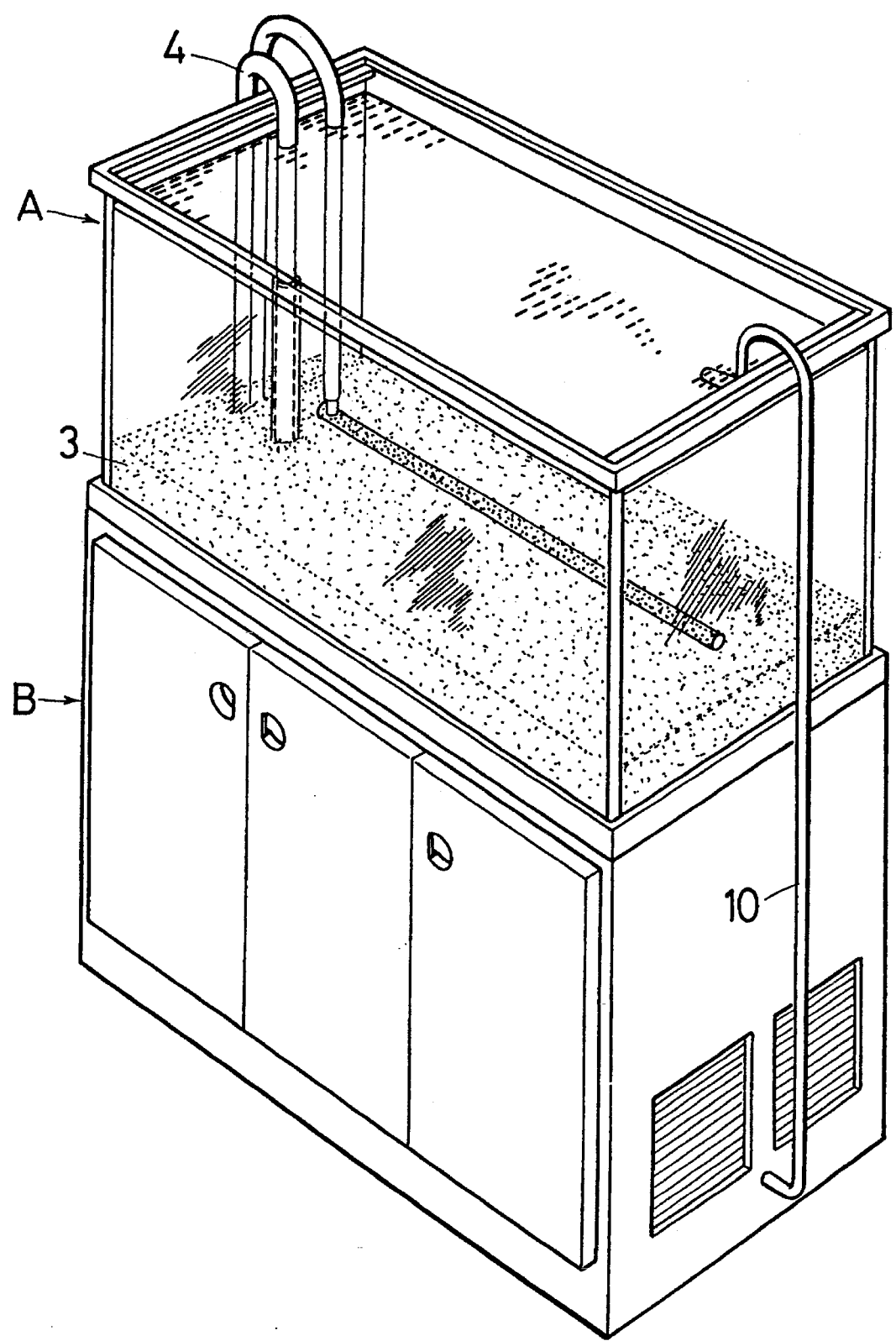
FIG. 2 is an external perspective view of the embodiment of the sea-water fish raising system.

FIG. 1 shows an embodiment of a sea-water fish raising system according to the present invention. This sea-water fish raising system generally includes a tank A for storing water for raising the sea-water fish, a bottom filtering section provided within the tank A, an external filtering device C described later in detail, a feed-out tube 4 for communicating the bottom filtering section to the external filtering device, and a pump E which serves as the circulating means for circulating the water between them.

The tank A is rectangular with four sides which are provided with a transparent material such as glass, or a plastic such as acrylic in such a manner that the sea-water fish within the tank can be seen from all four sides.

A punched plate 1 is provided in the bottom of the tank A at a distance of about 35 mm from the bottom surface to form a filtering material supporting plate. The distance from the bottom surface to the punched plate 1 is preferably set to the range 20 mm–50 mm. A bottom space P is formed in this way between the bottom surface of the tank A and the punched plate 1.

The top of the punched plate 1 is covered with a mesh-like sheet 2 which has holes of about 2 mm. Over the mesh-like sheet, there is provided coral sand 3 which is a sand-like material containing a lot of calcium.

The coral sand 3 is spread out uniformly on the mesh-like sheet 2. The coral sand 2 does not fall through since the holes in the mesh-like sheet 2 are smaller than the diameter of the respective grain of the coral sand.

The punched plate 1 has the fine holes 1A of 3 mm–5 mm at intervals of 8 mm–10 mm. Since the coral sand 3 is loaded on top of this punched plate 1, this punched plate 1 has a sufficient strength so as to be able to withstand the weight.

The thus constructed punched plate 1 serves to define the bottom space P on the bottom of the tank by forming the filtering material supporting plate. Further, it also serves to allow the water which has flowed through the coral sand etc. to escape below.

In this embodiment, the punched plate 1, the mesh-like like sheet 2 and the coral sand 3 constitute the bottom filtering unit.

The coral sand which is used in the present invention has a grain size of 2.5 mm–3.5 mm. Preferably, coral sand having a grain size of about 3 mm is used.

In this regard, it should be noted that the grain size of the coral sand 3 means the largest diameter thereof, since the grain of the coral sand is not always a spherical shape. Hereinafter, the grain size of the coral sand 3 is defined in this way.

Normally, in order to obtain coral sand having a grain size of 3 mm, coral sand is passed through a mesh-like sieve having a plurality of holes, each of which having a diameter slightly larger than 3 mm. Then, the passed coral sand is again passed through another mesh-like sieve having a plurality of holes, each of which having a diameter sightly smaller than 3 mm. By passing the coral sand through these sieves twice, it is possible to obtain coral sand having a grain size of about 3 mm.

The size of the grain of the coral sand 3 is actually very important. However, the inventors of the present invention did not conceive the importance in the size of the sand at the beginning of the development of this invention, and therefore the inventors attempted to use coral sand comprised of coarse grains each having as large a size as possible at about 5–6 mm in view of the expectation that blockage of the coral sand 3 could probably be prevented if the size of the sand was relatively large.

However, since coral sand of this size provided larger spaces therebetween and food and excrement were likely to enter into the spaces in the coral sand, it has been found that the water inevitably passed through the unblocked parts in the coral sand to flow out by bypassing the blocked parts.

As a result, decomposition occurred due to the stagnation in the blocked parts, and therefore anaerobic bacteria propagated and thereby poisonous gases accumulated.

In view of this drawback, it was found that if the size of the coral sand was of the order of 2.5 mm–3.5 mm, as in the present invention, no blockage or clogging with excrement is caused by the uneven flow of water and therefore the water flows uniformly through the coral sand which serves as the filtering material.

Furthermore, the water which has entered the bottom space P is raised temporarily to the top of the tank in order to feed the water to the filtering system which is placed on a mounting platform below the tank. In this case, the pumping pressure of the pump at this time is within the range which provides a normal circulating rate which is appropriate for raising fish (1.5–2 changes of the water in the tank every 10 minutes). Therefore, the output of the pump is naturally limited to the above range, and it is not possible for the output to be set substantially higher than such range.

When a coral sand 3 having a grain size that is greater than 5 mm is used, the negative pressure acting as the suction force does not act uniformly over the whole of the bottom space but is instead concentrated and therefore becomes greater in the vicinity of the suction port, because in sea-water fish tanks that are ordinarily available, the suction port is positioned at the corner of the tank. As a result, the suction force becomes weaker at points that are separated from the suction port.

Hence, water is circulated only around the suction port, and so there is no circulation of the water at remote points, which results in an uneven circulation. Therefore, in ordinarily available sea-water fish tanks, it is not possible to obtain a uniform circulation of water over the whole of the filtering material supporting plate.

As a result, eddies are produced in the flow in places which are remote from the suction port, thus leading to a high circulation efficiency.

On the other hand, when coral sand 3 having a grain size of equal to or less than 2.5 mm, in particular equal to or less than 2.0 mm is used, the whole of the coral sand tends to become blocked or clogged. As a result, it becomes; difficult to cause the water to pass through the coral sand effectively, and therefore the circulation efficiency of the water is drastically deteriorated. In this case, even if the pump is replaced with another pump having a large pumping power in order to improve the circulation efficiency, nothing would happen other than a larger load being added to the pump, which would then lead to troubles arising with regards to the pump.

However, when coral sand 3 having a grain size of 2.5 mm–3.5 mm is used, as in this present invention, a suction force is applied uniformly over all of the coral sand. As a result, uneven circulation will not be caused over the flow of the water in the tank (see the experimental data described hereinafter). Hence, the flow does not form eddies in some points, and there is no propagation of harmful anaerobic bacteria.

In this case, the coral sand is provided on the filtering material supporting plate in such a manner that the thickness thereof lies between 20 mm and 70 mm, and more preferably between 30 mm and 50 mm. This is because if the thickness of the coral sand is less than 20 mm, no practical effect can be obtained due to a lowered filtering effect. On the other hand, if the thickness of the coral sand exceeds 70 mm, bacteria eats and exhausts oxygen, resulting in a reduction of oxygen dissolved in the filtered water.

As shown in the drawing, slightly above the coral sand 3, there is provided an air-stone 5 which discharges air supplied from an air pump disposed outside the tank.

On the other hand, the water which has been filtered through the coral sand 3 is sucked from the suction port and raised to the top of the tank through the feed-out pipe 4. Thereafter the water descends and is fed to a filtering system which is the external filtering device.

On the feed-out pipe 4, there is provided a bypass means (,open and close means) for feeding the water in the tank into said external filtering device directly without passing through the bottom filtering unit as necessary. Since this bypass means has a convenient function, hereinafter description will be made with reference to the open and close means.

Figures 3A, 3B:
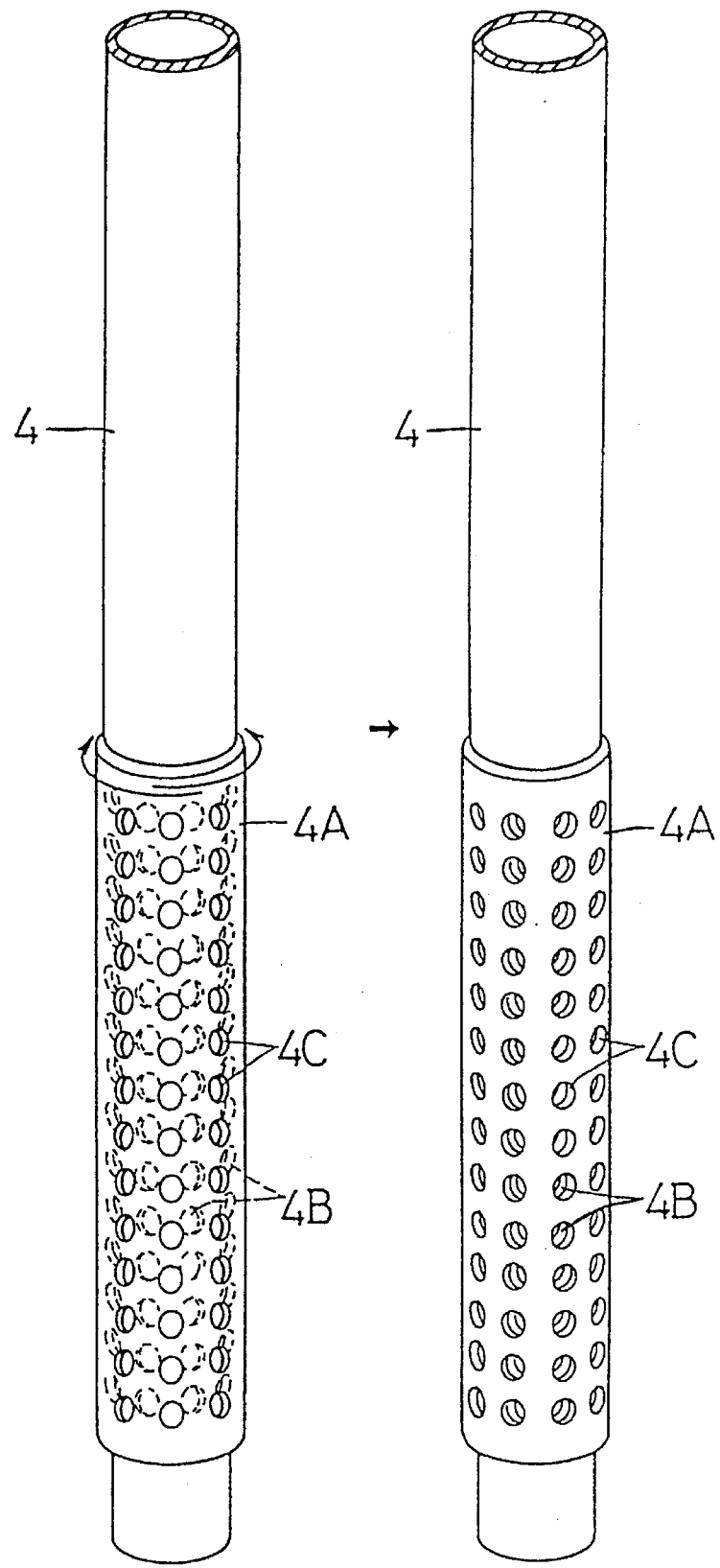
FIG. 3 is a perspective view which shows an example structure of the bypass means of the present invention.

FIG. 3 is an enlarged perspective view of the bypass means. The feed-out pipe 4 is formed with a plurality of small holes 4B. On the outer circumferential surface of the feed-out pipe 4, an outer pipe 4A is tightly and rotatably fitted.

The outer tube 4A is also formed with a plurality of small holes 4C which are arranged with the same pitch and intervals as those of the small holes 4B of the feed-out pipe 4. Therefore, by rotating the outer pipe 4A around the feed-out pipe 4 so as to mate the small holes 4B of the Feed-out pipe 4 with the small holes 4C of the outer pipe 4A as shown in FIG. 3 (A), it becomes possible to introduce the water in the tank into the feed-out pipe 4.

On the other hand, by rotating the outer pipe 4A around the feed-out pipe 4 so as not to overlap the small holes 4B of the feed-out pipe 4 with the small holes 4C of the outer pipe 4A as shown in FIG. 3 (B), the water in the tank does not flow into the feed-out pipe 4.

In this regard, it should be noted that the shape of the small hole 4B and the small hole 4C is not limited to a specific shape such as triangle, square, circle or groove shape. Further, it is also possible to adopt the number of them and the size of each hole freely.

Figures 4A, 4B:
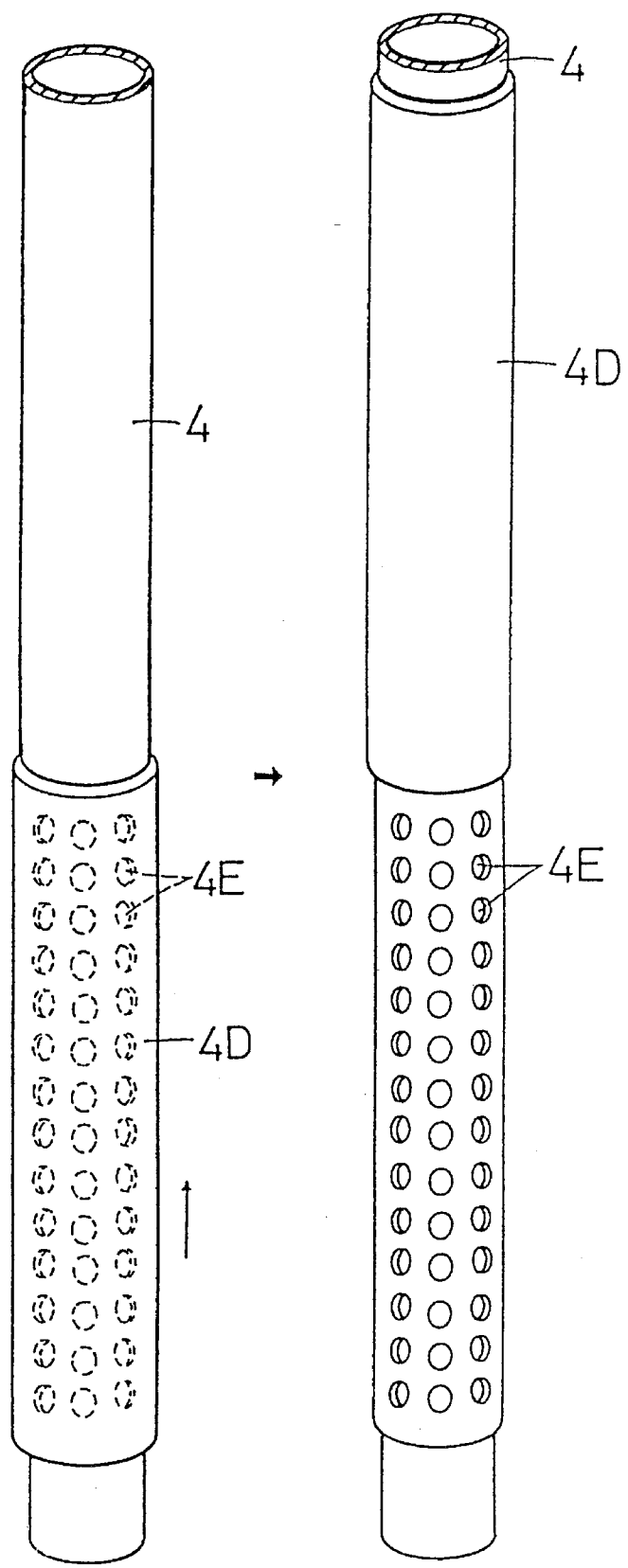
FIG. 4 is a perspective view which shows another example structure of the bypass means of the present invention.

FIG. 4 is an enlarged perspective view of another example of the bypass means. The feed-out pipe 4 is formed with a plurality of small holes 4E at the lower side thereof. Around the outer circumferential surface of the feed-out pipe 4, an outer pipe 4D is tightly fitted so as to be slidable in up and down directions. Therefore, if the outer pipe 4D is lowered so as to cover the small holes 4E of the feed-out pipe 4, the water in the tank does not enter into the feed-out pipe 4. On the other hand, if the outer pipe 4D is moved upwardly in such a manner that the outer pipe 4D does not cover the small holes 4E of the feed-out pipe 4, the water in the tank can enter into the feed-out pipe 4.

As described above, as the outer pipe 4D is tightly fitted around the outer circumferential surface of the feed-out pipe 4 in a freely slidable manner, it is possible to stop the position of the outer pipe 4D at an arbitrary position with respect to the feed-out pipe 4. As a result, since it becomes possible to adjust the number of the small holes which are exposed, the amount of the water which flows into the feed-out pipe 4 can be adjusted.

As stated in the above, the feed-out pipe 4 is provided with the bypass means which can switch the communication of the water between the tank and the inside of the feed-out pipe 4 freely by opening or closing the small holes of the feed-out pipe 4. Therefore, when the water in the tank is partially replaced, it is possible to feed out the remaining water in which sludge is floated and contained into the external filtering device directly by easy switching operation without causing the water to pass through the bottom filtering unit, so that it is possible to prevent the bottom filtering unit from becoming contaminated by the sludge.

In more detail, when the tank is cleaned periodically, the water in the tank is sucked out by means of a suction pipe for cleaning use in order to remove substances such as moss, castings or remaining food adhered to the coral sand or inner walls of the tank. At this time, one-third of the water in the tank is sucked out for replacement, but the remaining two-thirds of the water remains in the tank. The sludge from such substances are then floated up to mix with this remaining water.

Under these conditions, by opening the bypass means described above, namely by rotating the outer pipe as shown in FIG. 3 or by slidably moving the outer pipe upward as shown in FIG. 4, the remaining water is caused to be fed into the feed-out pipe 4. The water thus introduced into the feed-out pipe 4 is fed into the external filtering device, namely the filtering system provided in the supporting frame B, and then the water is filtered.

According to the present invention, since the feed-out pipe 4 is formed with the bypass means which enables the water to flow directly from the tank into the inside of the feed-out pipe 4 without passing through the bottom filtering unit, it is possible to prevent the bottom filtering unit from being soiled by the floating sludge when the water in the tank is partially replaced in the same manner as described above. As a result, the frequency of cleaning and replacement of tile water can be reduced.

Turning now back to FIG. 1, below the water tank A, there is provided the cabinet B on which the tank A is placed. In the cabinet, there is provided the filtering system including the external filtering device. This filtering system mainly includes a sealed type external filter C, a sterilizing lamp section D and a circulating pump E.

The sealed type external filter C includes a ceramic filter material 7 and a mat material 8 for filtering out any foreign materials which are contained in the water.

In general, available filtering materials can be classified into two types according to their filtering function. One type can perform physical filtration which removes foreign materials contained therein, and the other type can perform biological filtration in which anaerobic bacteria are propagated and harmful products are converted. In this embodiment, the ceramic material 7 which is used in the external filtering device executes the biological filtration and the mat material 8 executes the physical filtration for removing foreign bodies contained in the water.

Further, the ceramic material 7 is used in order to raise the pH of the water. In this regard, it should be noted that it is very important to keep the pH of the water within the range of pH 7.8 to pH 8.3 when sea-water fish are being raised.

The water which has been supplied to the sealed type external filtering device C passes through the ceramic filter 7 to the mat material 8 and is subjected to biological and physical filtration. The filtration in this filtering device is carried out in order to make more complete filtration than the filtration with the coral sand which is carried out in the bottom of the tank.

Furthermore, the air-stone 5 which acts as an air supply source from an external air pump is provided just above the coral sand 3, and discharges air into the water.

The filtering system in this embodiment is of the sealed type. Since the filtering system is constructed as a sealed type, the region where the water can contact with air during its circulation is limited to just the upper surface in the tank, and this causes a deficiency of dissolved oxygen. For this reason, in this system the air-stone 5 is used as a means of making up this deficiency.

The water which has been supplied to the sealed type external filter C is then sent to the sterilizing lamp section D which is located downstream.

The sterilizing lamp section is provided for sterilizing microorganisms by means of the sterilizing effect of light. In this filtering system, the sterilizing efficiency is better, since its is performed on the water which has been passed through the two processes of the biological filtration and the physical filtration in the sealed type external filter.

The circulating pump E circulates the water from the filtering system apparatus to the tank A. In this illustrative embodiment, the pump E is mounted on the sealed type external filtering device. However, the mounting position of the pump E is not limited to such a location, and it is sufficient if it is disposed in any part of the circulating passage of the water.

Hereinafter, the process in which the water fed out from the tank is circulated is described.

First of all, when the pump is started, the water in the tank A flows above and along the surface of the coral sand 3, and then the water flows into the bottom space P through the holes; in the mesh-like sheet 2 and the fine holes 1A in the punched plate 1.

Next, the water enters into the suction port 4S and flows through the feed-out tube 4, and after being raised temporarily to tile top of the tank A, the water then descends and is supplied to the sealed type external filter C.

Here, the water is biologically filtered and physically filtered on passing through the ceramic filter 7 and the mat material 8.

After this, it is supplied to the sterilizing lamp portion D via the supply tube 9 by force supplied from a pump.

Within the lamp portion D, microorganisms are killed by the sterilizing effect of the light in this process. Thereafter, the water is raised again to the top of the tank A through the feed tube: 10 and discharged from the vicinity of the surface of the water in the tank A.

In the present invention, it is important for the filtering material selected for the filtering material in the bottom filter to be selected from sand-like filtering materials having a lot of calcium, such as coral sand. Furthermore, instead of the normally accepted grain size of 5 mm or greater, it is preferred that the grain size of the selected filtering material lie within the particular range of 2.5 mm to 3.5 mm.

Tests were carried out with sand-like materials having a grain size of about 3 mm, and then these results were compared with the results of tests carried out on sand-like materials having a grain sizes of 2 mm and 5 mm in order to confirm that sand-like materials that have a grain size that lie within the range of 2.5 mm–3.5 mm exhibit greater effectiveness as filtering materials, and these tests are therefore described hereinbelow (Refer to the example experiments below).

Moreover, it is known from other tests that sand-like materials having a grain size below 2.5 mm or above 3.5 mm are not effective.

TEST 1

A tank system for raising sea-water fish as described in the embodiment was prepared. Further, three tanks (600 mm×300 mm×360 mm) having an external filter system apparatus as described in the embodiment were used. Further, the water contained in the respective tank is adjusted to pH 7.8.

One of the three tanks was set up as a tank in which coral sand of about 3 mm was used as a filtering material (Tank A), another was set up as a tank in which coral sand of 5 mm was used as a filtering material (Tank B), and the remaining tank was set up as a tank in which coral sand of 2 mm was used as a filtering material (Tank C).

In addition, a further tank system was prepared. The tank system includes a Tank D in which no filtering material was used in the bottom, but it had an external filter system apparatus. Further, the water contained therein was adjusted to pH 7.8.

Next, twenty "Cobalt Sparrows" (the name of a type of fish) were introduced into each tank.

The ammonia and nitric acid concentrations in the water were monitored for 75 days and the results were recorded in order to cheek the effect of the filtering material.

Figure 6:
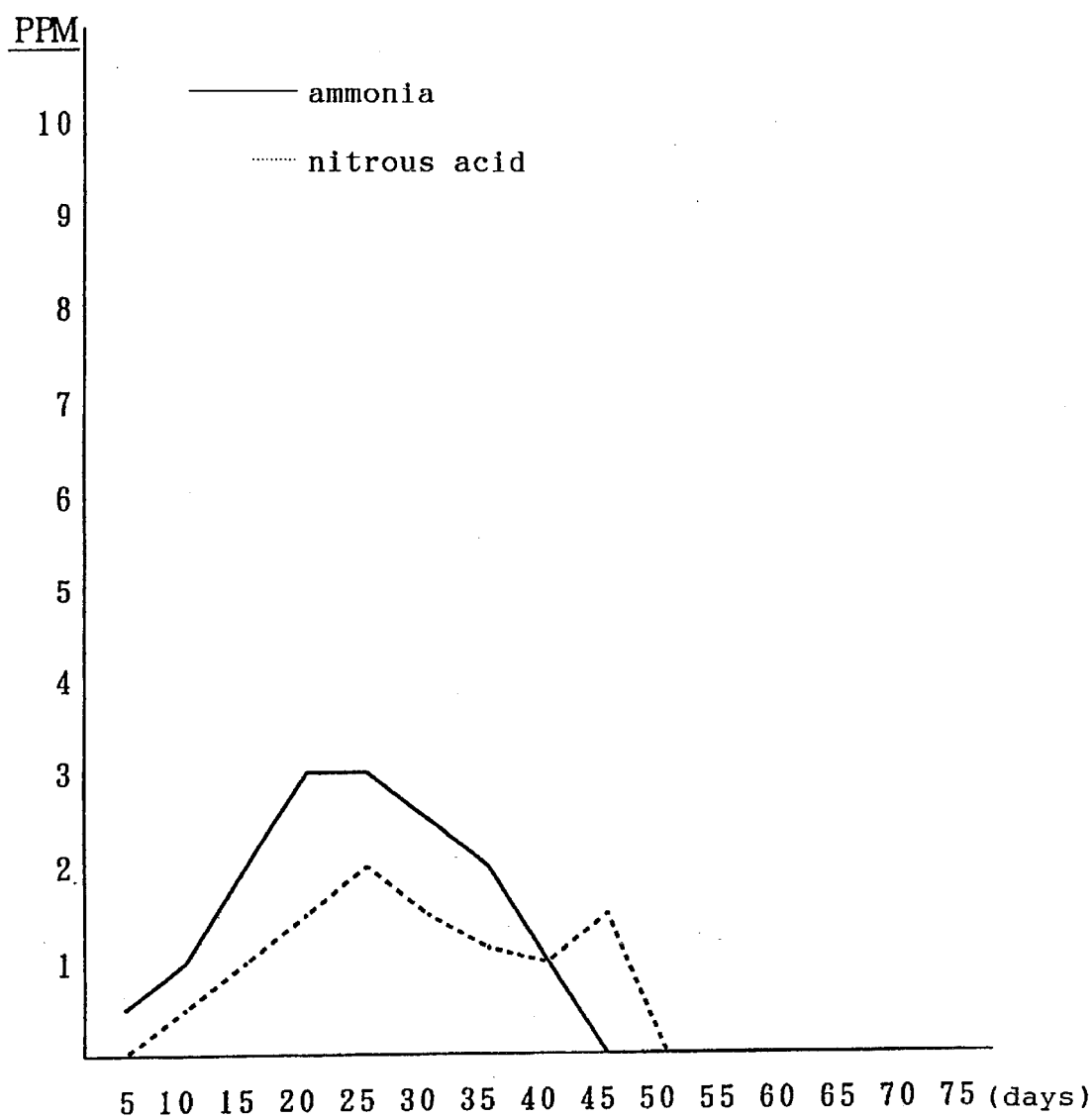
FIG. 6 is a graph which shows the change with time in ammonia and nitric acid in Tank A in which coral sand having a grain size of about 3 mm was used.

The changes with time in the concentration of ammonia and nitric acid in the tank where coral sand of about 3 mm had been used (Tank A) are shown in FIG. 6.

It is clear from these graphs that, in the ease of Tank A, the ammonia concentration reached zero on the 45th day and the nitric acid concentration reached zero on the 50th day.

Furthermore, all of the fish survived to the 75th day, and were swimming around in the tank.

Figure 7:
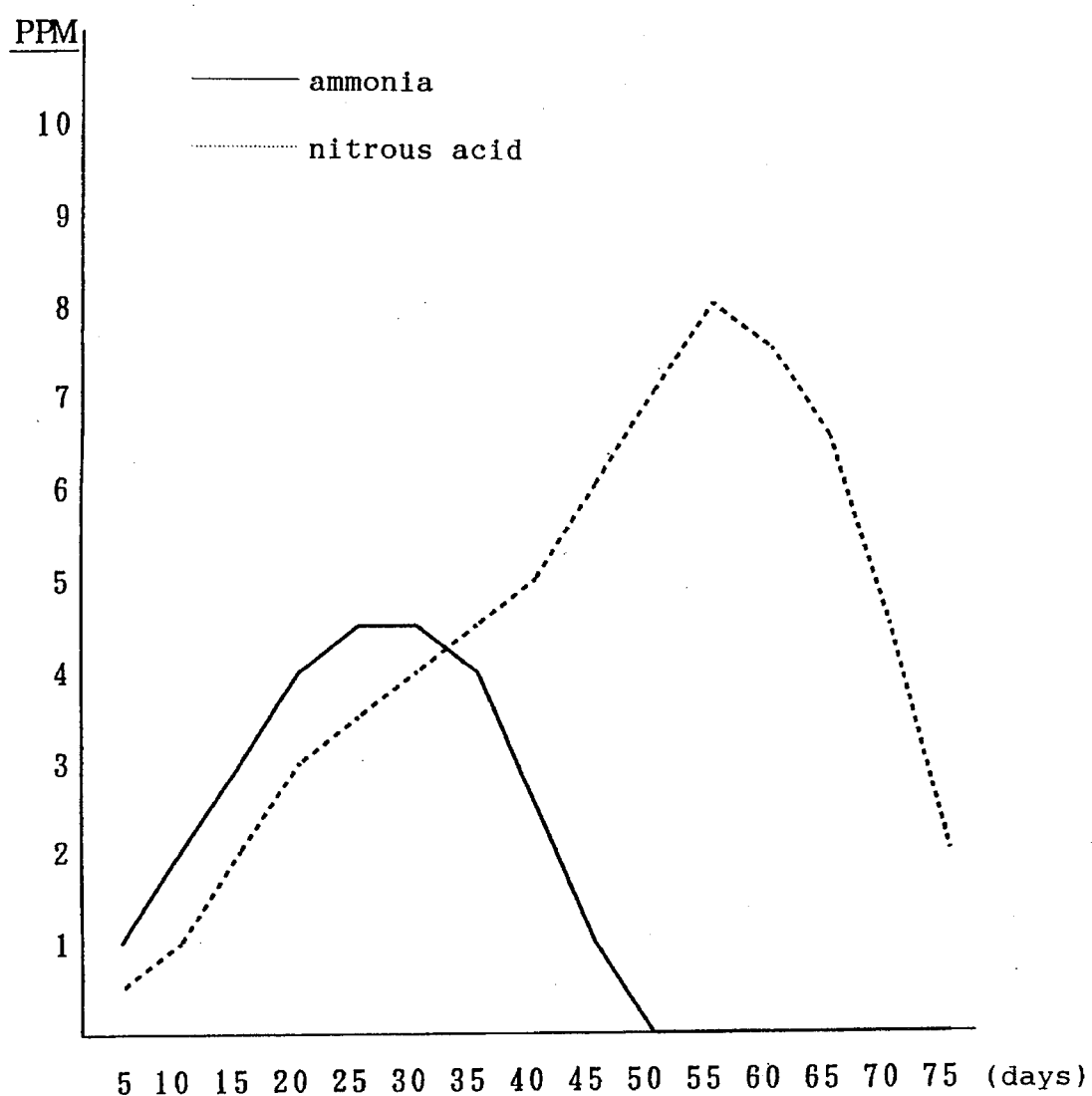
FIG. 7 is a graph which shows the change with time in ammonia and nitric acid in Tank B in which coral sand having a grain size of about 5–7 mm was used.

The changes witch time in the ammonia and nitric acid in the tank where coral sand of 5 mm had been used (Tank B) are shown in FIG. 7.

It is clear from these graphs that, in the case of Tank B, the ammonia reached zero on the 50th day but the nitric acid reached a peak on the 55th day and was still at 2 ppm on the 75th day.

Furthermore, all of the fish survived to the 75th day, but their movement lacked sharpness and their color was poor.

Figure 8:
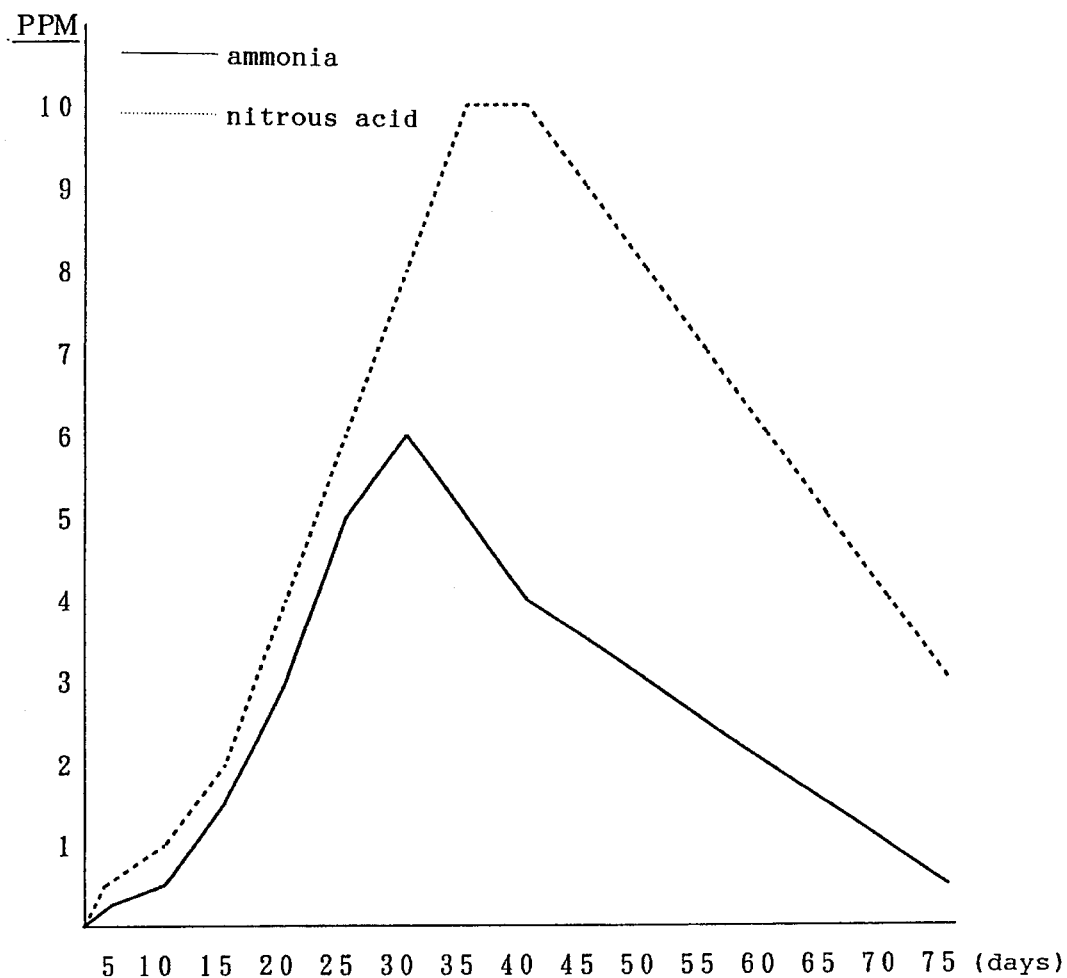
FIG. 8 is a graph which shows the change with time in ammonia and nitric acid in Tank C in which coral sand having a grain size of about 2 mm was used.

The changes with time in the ammonia and nitric acid in the tank where coral sand of 2 mm had been used (Tank C) are shown in FIG. 8.

As shown in FIG. 8, in Tank C, the concentration of ammonia on the 75th day was 0.5 ppm, and the concentration of nitric acid on the 75th day was 3 ppm.

Furthermore, two of the fish had died as of the 25th day, and five of the fish had died as of the 30th day.

Moreover, even though 13 of the fish were still alive on the 75th day, their movement lacked sharpness and their color was poor.

Figure 9:
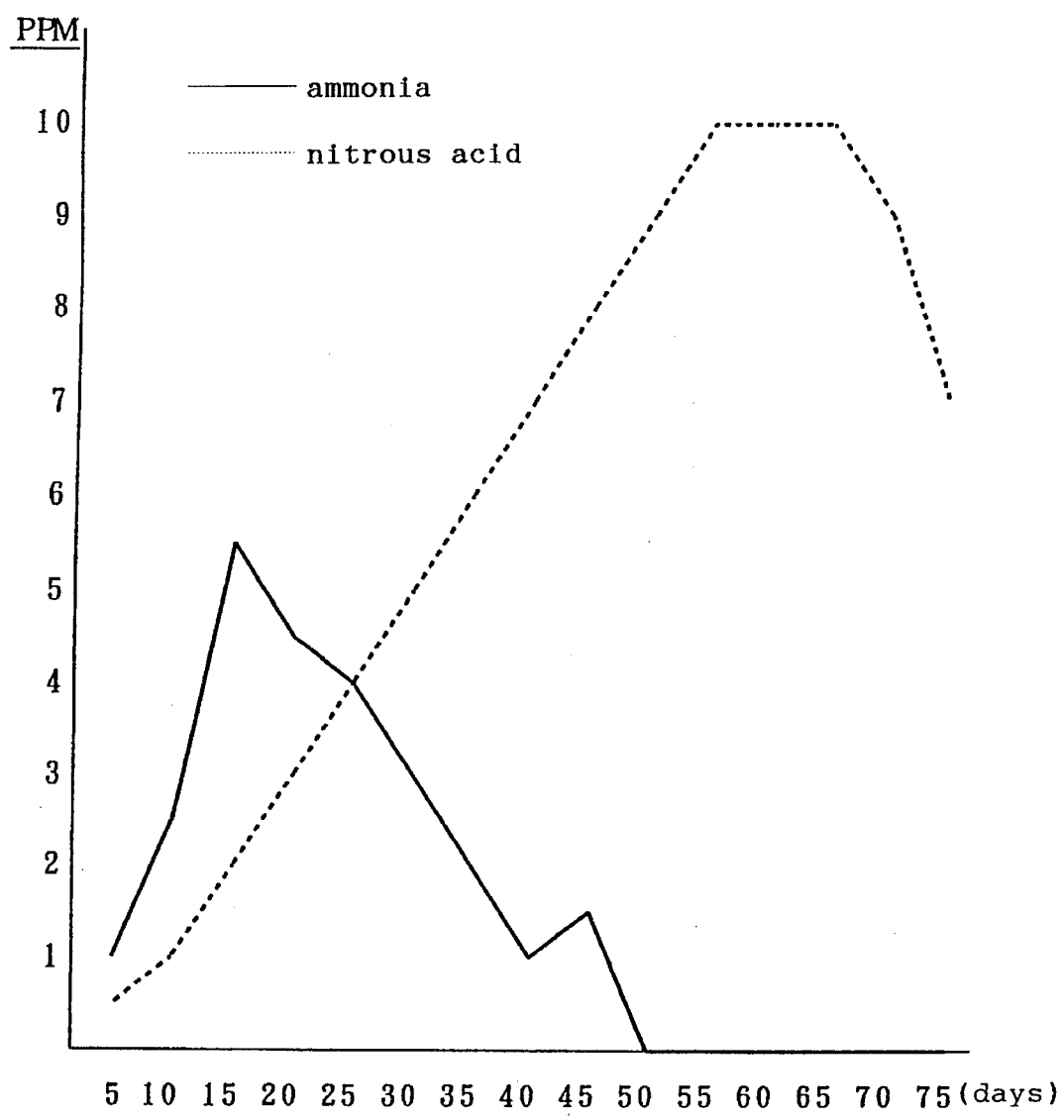
FIG. 9 is a graph which shows the change with time in ammonia and nitric acid in Tank D in which no filter material had been used.

The changes with time in the ammonia and nitric acid in the tank where no filtering material had been used (Tank D) are shown in FIG. 9.

It is clear from these graphs that, in the case of Tank D, the ammonia reached zero on the 50th day but the nitric acid reached a peak on about the 60th day and was still at 7 ppm on the 75th day. Furthermore, all of the fish had died by the 15th day.

TEST 2

Ink droplets were dripped into Tank A, Tank B and Tank C for this test and observations were made visually under conditions in which the circulation in the tank changed 1.5 times every 10 minutes.

Figure 5A:
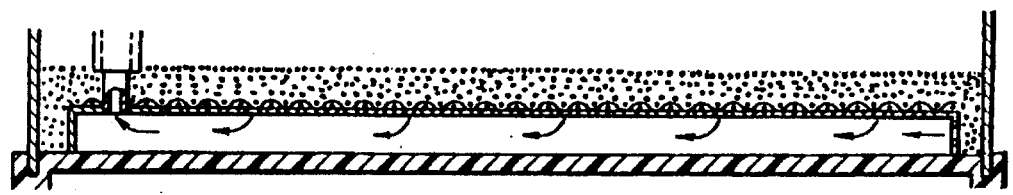
FIG. 5 (A) is a side view which illustrates diagrammatically the state of flow in the bottom part of Tank A.

The state of flow in the bottom part of Tank A is shown diagrammatically in FIG. 5(A). In Tank A, a uniform circulation passing uniformly through the whole of the filtering material supporting plate (punched plate) was observed.

Figure 5B:
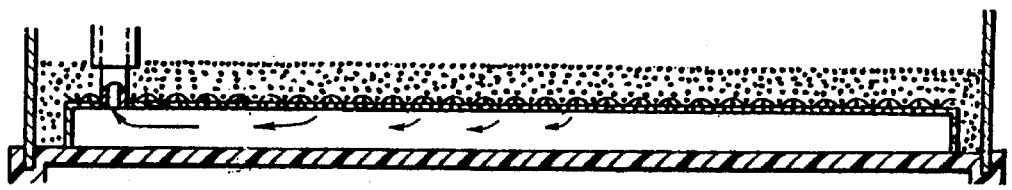

The state of flow in the bottom part of Tank B is shown diagrammatically in FIG. 5(B). In Tank B, the flow was observed to become more rapid on approaching the suction port, and to become slower on moving further away from the suction port.

Figure 5C:
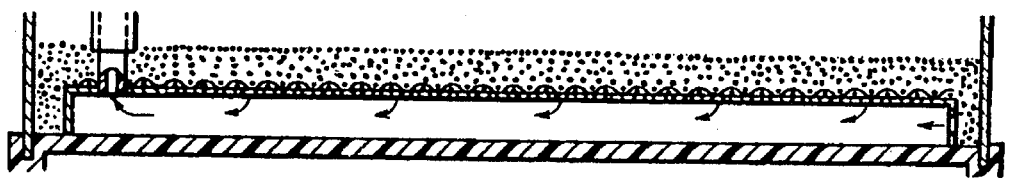

The state of flow in the bottom part of Tank C is shown diagrammatically in FIG. 5(C). In Tank C, the flow was observed to form eddies all over the bottom portion of the tank, and the water does not pass through the filter smoothly.

As seen from the results of the Tests described above, the sand-like material which forms a filtering material according to the present invention is very useful for raising sea-water fish if it is used in a display tank, since it promotes the propagation of aerobic bacteria and converts ammonia and nitric acid to harmless materials.

Further, if the bypass means is provided in the feed-out tube, it is possible to avoid that the bottom filtering section is contaminated by the floating substances in the water. This is because it becomes possible to directly feed the water containing the substances into the feed-out pipe by the bypass means when the water is changed or a part of the water is replaced.

The present invention was explained above with reference to the preferred embodiment. However, the present invention can be modified in various ways without departing from the gist of the invention. For this reason, it should be noted that the embodiment described above is merely one example, and therefore the present invention should not be limited to the embodiment.

For example, although the above description is directed to the case where the present invention is applied to the raising method for sea-water fish, the present invention can also be applied to raising method or display tank for fresh-water fish.

Finally, it should be noted that the scope of the present invention will be determined only by the following claims.

What is claimed is:

1. A display tank for sea-water fish, comprising:

a filtering material supporting plate having a plurality of fine holes and an under surface, said filtering material supporting plate being placed on a bottom of the display tank so as to create a space between the bottom of the tank and the under surface of said filtering material supporting plate;

a filtering material placed on said filtering material supporting plate, said filtering material consisting essentially of coral sand having a grain size from 2.5 mm to 3.5 mm;

an external filtering device; and water circulating means for feeding filtered water, that has been filtered by said filtering material, from the space to said external filtering device via a feed-out tube.

2. A method for raising sea-water fish, comprising the steps of:

providing a display tank which includes a filtering material supporting plate having a plurality of fine holes and an under surface, said filtering material supporting plate being placed on a bottom of said display tank so as to create a space between the bottom of said tank and the under surface of said filtering material supporting plate, a filtering material being provided on said filtering material supporting plate, said filtering material consisting essentially of coral sand having a grain size from 2.5 mm to 3.5 mm, an external filtering device, and water circulating means for feeding water, that has been filtered by said filtering material, from the space to said external filtering device via a feed-out tube;

storing water in said tank; and raising sea-water fish in the water while filtering the water in said tank.

3. A fish-raising system, comprising:

a tank having a bottom for storing water;

a bottom filtering device, including a filtering material supporting plate having a plurality of fine holes and arranged so as to define a space thereunder, and a filtering material placed on said filtering material supporting plate;

an external filtering device disposed outside said tank;

a feed-out tube communicating between said external filtering device and the space beneath said bottom filtering device; and means for circulating water, that has been filtered by said filtering material, from the space beneath said bottom filtering device through said feed-out tube and said external filtering device and back to said tank.

4. The fish raising system of claim 3, wherein said external filtering device includes a filtering material comprising a ceramic filtering material and a filtering mat.

5. The fish raising system of claim 3, wherein said external filtering device is placed on a rack external to said tank.

6. The fish raising system of claim 3, wherein said filtering material of said bottom filtering device consists essentially of coral sand having a grain size of 2.5 to 3.5 mm.

7. A fish raising system, comprising:

a tank having a bottom for storing water;

a bottom filtering device including a filtering material supporting plate having a plurality of fine holes and arranged so as to define a space thereunder, and a filtering material placed on said supporting plate;

an external filtering device disposed outside said tank;

a feed-out tube communicating between said external filtering means and the space beneath said bottom filtering means;

means for circulating water, that has been filtered by said bottom filtering device, from the space beneath said bottom filtering device through said feed-out tube and said external filtering device and back into said tank; and bypass means provided with said feed-out tube for selectively feeding the water in said tank into said external filtering device without passing through said bottom filtering device.

8. The fish raising system of claim 7, wherein said bypass means includes at least one opening formed in said feed-out tube, and an outer tube having at least one opening, slidably fitted onto said feed-out tube for opening and closing said at least one opening of said feed-out tube.

9. The fish raising system of claim 7, wherein said bypass means includes at least one opening formed in said feed-out tube, and an outer tube having at least one opening, rotatably fitted onto said feed-out tube for opening and closing said at least one opening of said feed-out tube.

10. The fish raising system of claim 7, wherein said external filtering device includes a filtering material comprising a ceramic filtering material and a filtering mat.

11. The fish raising system of claim 7, wherein said external filtering device is placed on a rack external to said tank.

12. The sea-water fish raising system of claim 7, wherein said filtering material of said bottom filtering device consists essentially of coral sand having a grain size of 2.5 to 3.5 mm.

* * * * *